United States Patent
Brunner et al.

(10) Patent No.: US 8,128,174 B2
(45) Date of Patent: Mar. 6, 2012

(54) POCKETED MOLDED VEHICLE BACKREST

(75) Inventors: Stefan Brunner, Freising (DE); Klaus Boes, Beilngries (DE)

(73) Assignee: Lear Corporation, Southfield, MI (US)

( * ) Notice: Subject to any disclaimer, the term of this patent is extended or adjusted under 35 U.S.C. 154(b) by 200 days.

(21) Appl. No.: 11/343,495

(22) Filed: Jan. 31, 2006

(65) Prior Publication Data

US 2007/0176480 A1  Aug. 2, 2007

(51) Int. Cl.
*A47C 7/20* (2006.01)
(52) U.S. Cl. .......... 297/452.18; 297/452.65; 297/DIG. 2
(58) Field of Classification Search ............ 297/452.65, 297/284.4, 452.18, 452.36, 452.37, 452.26, 297/452.27, DIG. 2
See application file for complete search history.

(56) References Cited

U.S. PATENT DOCUMENTS

| | | | | |
|---|---|---|---|---|
| 4,241,555 A | * | 12/1980 | Dickens et al. | .................. 52/454 |
| 4,555,140 A | | 11/1985 | Nemoto | |
| 5,244,612 A | | 9/1993 | Iwasawa et al. | |
| 5,401,456 A | * | 3/1995 | Alesi et al. | ..................... 264/511 |
| 5,786,394 A | | 7/1998 | Slaven | |
| 5,853,512 A | * | 12/1998 | McKinney | ........................ 156/78 |
| 6,027,171 A | | 2/2000 | Partington et al. | |
| 6,059,369 A | | 5/2000 | Bateson et al. | |
| 6,423,388 B1 | | 7/2002 | Bateson et al. | |
| 6,679,550 B2 | * | 1/2004 | Goor et al. | ................ 297/216.11 |
| 6,688,686 B1 | * | 2/2004 | McEvoy et al. | ............ 297/284.4 |
| 6,733,064 B2 | | 5/2004 | Fox et al. | |
| 6,733,710 B2 | | 5/2004 | Lewis | |
| 6,786,551 B2 | * | 9/2004 | Brewer et al. | ............ 297/378.12 |
| 7,220,376 B2 | * | 5/2007 | Hetzel et al. | ................... 264/125 |
| 7,234,763 B2 | | 6/2007 | Gupta et al. | |
| 7,395,566 B2 | * | 7/2008 | Hetzel et al. | ....................... 5/653 |
| 2002/0195736 A1 | * | 12/2002 | Potter | .............................. 264/51 |
| 2003/0186044 A1 | | 10/2003 | Sauniere et al. | |
| 2004/0084937 A1 | | 5/2004 | Berta | |
| 2004/0155513 A1 | * | 8/2004 | Gupta et al. | ............. 297/452.65 |
| 2004/0169361 A1 | | 9/2004 | Lewis | |
| 2005/0189806 A1 | | 9/2005 | Hall et al. | |
| 2007/0028385 A1 | * | 2/2007 | Hetzel et al. | ....................... 5/653 |

FOREIGN PATENT DOCUMENTS

| | | |
|---|---|---|
| DE | 3308496 | 9/1984 |
| DE | 3308496 C1 | 9/1984 |
| DE | 19635734 A1 | 4/1997 |
| DE | 19652690 A1 * | 6/1998 |
| DE | 10321289 A1 | 12/2004 |
| WO | 9919164 A1 | 4/1999 |
| WO | WO 01/92051 | 12/2001 |

OTHER PUBLICATIONS

DE Office Action, 102006061034.2-16 dated Jul. 19, 2010.

* cited by examiner

*Primary Examiner* — Anthony D Barfield
(74) *Attorney, Agent, or Firm* — MacMillan, Sobanski & Todd, LLC

(57) ABSTRACT

A framework and method of forming a framework is provided for a backrest of a vehicle seat. The framework includes a support member having a first wall portion and a second wall portion. The second wall section is spaced from the first wall portion at a plurality of locations to form a plurality of hollow pocketed sections. An expandable plastic material is disposed in and substantially fills the plurality of pocketed sections. The support member in cooperation with the expandable plastic material provides rigidity to the support member.

1 Claim, 4 Drawing Sheets

POCKETED MOLDED VEHICLE BACKREST

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to vehicle seats, and more specifically to a plastic framework for a backrest of a vehicle seat.

2. Description of the Related Art

Vehicular backseat backrests typically comprise a carpeted section attached to a sheet metal back panel that faces the interior of a vehicle trunk. A frame consisting of bended tubes welded together is provided for the structural support of the vehicle backrest. A cushion is formed over the frame and a layer of skin is wrapped over the cushion and the frame.

The frame is typically made from steel or aluminum. Aluminum is lighter weight than steel frames and may be bent to form the backrest frame; however, the shapes are somewhat limited due to the bends in the frame and the resulting points of weaknesses created. Steel frames although stronger than aluminum frames are heavier.

Plastics have been used to form seat structures but current plastic structures cannot meet energy absorption requirements energy nor do they have the necessary stiffness to support the backrests as do current metal frame structures.

BRIEF SUMMARY OF THE INVENTION

The present invention has the advantage of using a plastic material as a support member for the framework of a backrest of a passenger seat of a vehicle. The framework uses a molded support member with closed wall sections and EPP-filled pocketed sections to enhance the rigidity and stiffness of the support member.

In one aspect of the present invention, a framework is provided for a backrest of a vehicle seat that includes a support member having a first wall portion and a second wall portion spaced from the first wall portion at a plurality of locations to form a plurality of hollow pocketed sections. An expandable plastic material is disposed in and substantially fills the plurality of pocketed sections. The support member in cooperation with the expandable plastic material provides rigidity to the support member.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
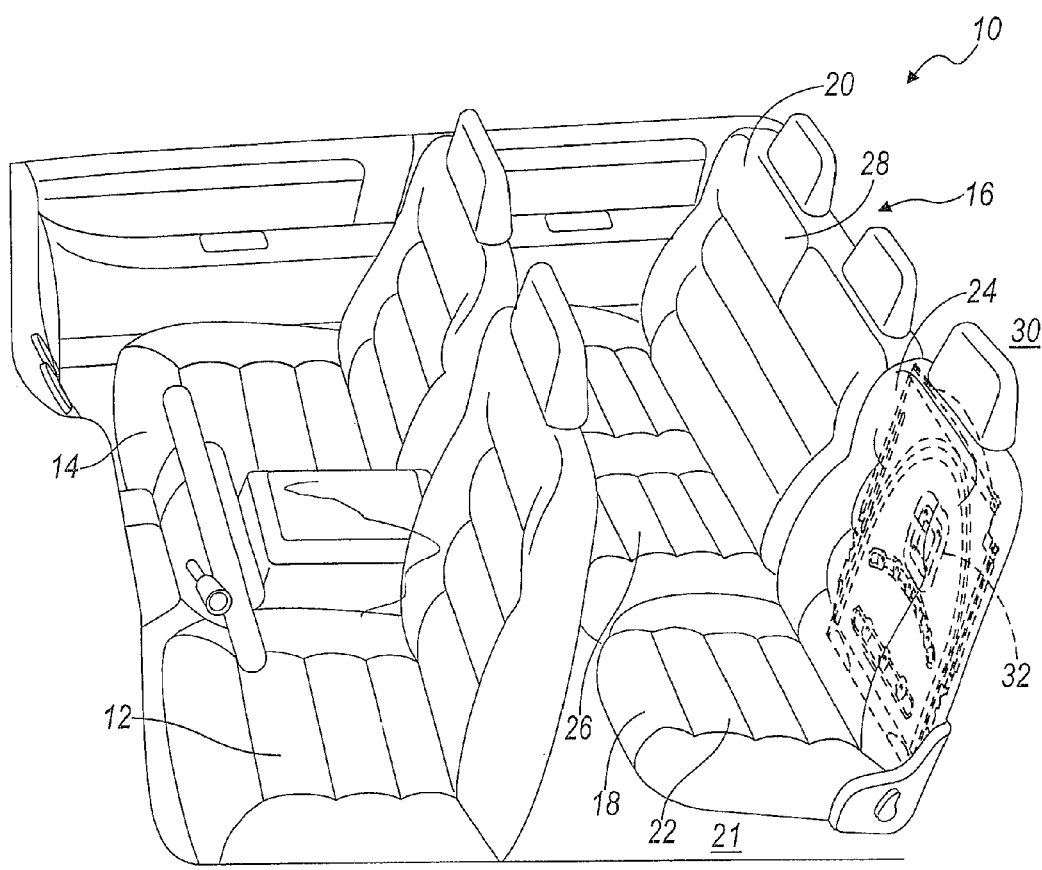
FIG. 1 is a perspective view of an interior passenger compartment of a vehicle.

Referring now to the drawings, there is illustrated in FIG. 1 an interior of a vehicle shown generally at 10. The interior of the vehicle 10 includes a driver's seat 12, a front passenger's seat 14, and split folding rear passenger seats indicated generally at 16. The split folding rear passenger seats 16 are commonly comprised of a 60/40 seat in which a first rear passenger seat 18 provides seating for a single passenger and a second rear passenger seat 20 provides seating for up to two passengers. Both the first passenger seat 18 and the second passenger seat 20 are mounted to a vehicle floor or body shown generally at 21.

The first passenger seat 18 includes a seat portion 22 and a backrest portion 24. Similarly, the second passenger seat 20 includes a seat portion 26 and a backrest portion 28. Both the backrest portions 24, 28 fold down to provide access from the rear of the vehicle interior 10 to a vehicle trunk shown generally at 30.

Both backrest portions 24 and 28 include a structural framework. A structural support member 32 is shown disposed within the backrest portion 24 of the first passenger seat 18 for providing structural support to the backrest portion 24. Similarly the second passenger seat 20 includes a respective structural member for providing structural support to the backrest portion 28.

Figure 2:
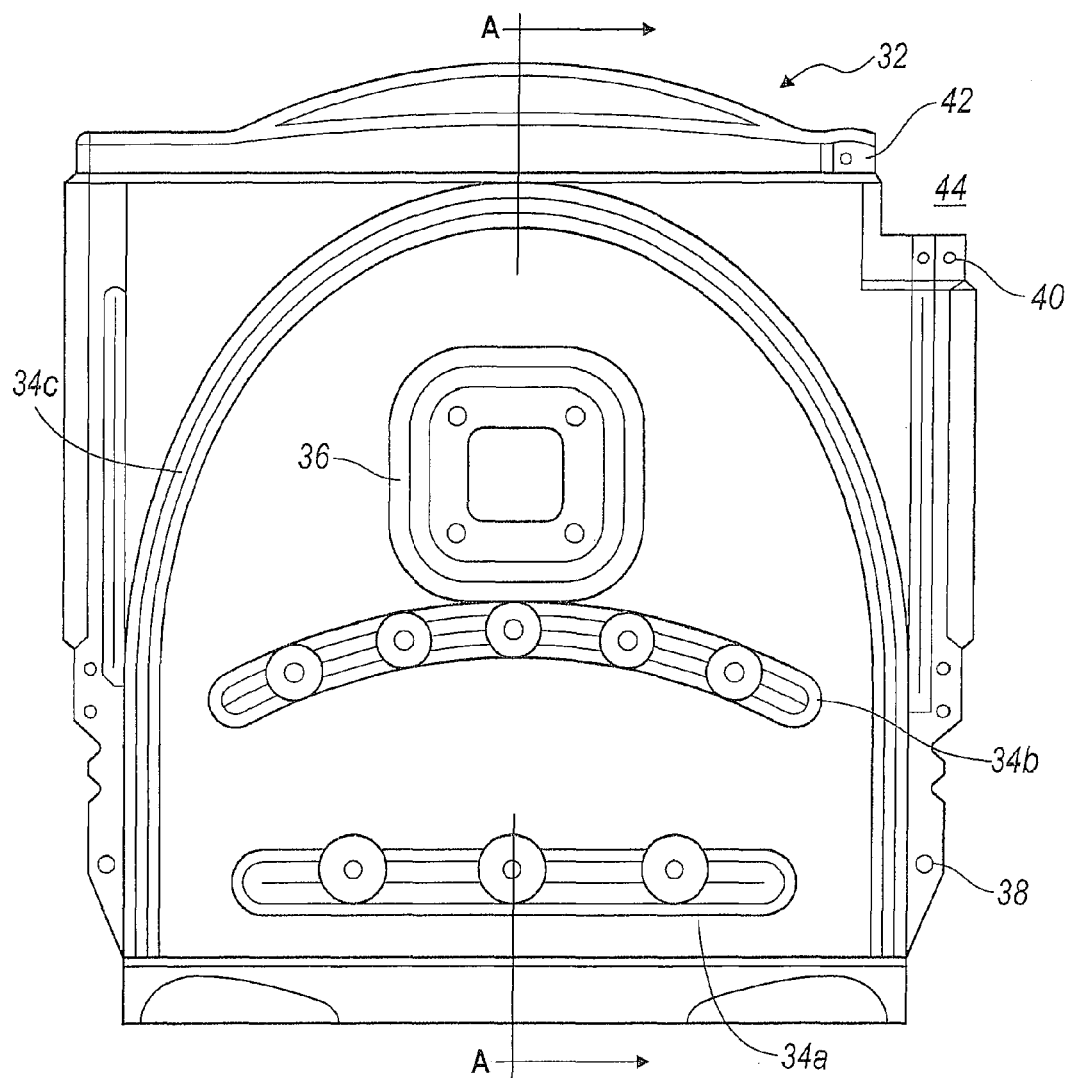
FIG. 2 is a front view of the support member of the backrest portion of a vehicle.

FIG. 2 illustrates a front view of the support member 32 of the backrest portion 24 (shown in FIG. 1). The support member 32 is made from a plastic polycarbonate ABS blended resin, or other similar, suitable material. The support member 32 is formed to a desired shape of the backrest 10 of a vehicle (not shown) for structurally supporting and providing a framework for the backrest portion 24. The support member 32 includes at least one strengthening rib such as strengthening ribs 34a, b, c for providing added stiffness, if required. The strengthening ribs 34a, b, c may include varying geometrical shapes for adding rigidity to various regions of the backrest portion 28.

A tether anchor 36 may be secured to the support member 32 for allowing an accessory, such as a child seat, to be anchored to the support member 32. Additional mounts may be secured to for mounting other accessories to the backrest portion 24 or for securing the support member 32 to the vehicle body 21. A mount 38 is secured to the support member 32 for mounting the backrest 24 to vehicle structure (not shown). A mount 40 may also be secured to the support member 32 for receiving a seat latch member (not shown) for selectively securing the backrest 24 in its upright position.

The support member 32 may further include a mount 42 secured to the support member 32 for mounting a seat belt retractor (not shown). Alternatively, the seat belt retractor may be secured to the vehicle body and the support member 32 may further include an opening 44 for allowing access to the seat belt retractor. Preferably each of the respective mounts 38, 40, 42 including the tether anchor 36 including additional mounts are secured by insert molding the respective members to the support member 32 during the molding process of the support member 32. Alternatively, the respective mounts 38, 40, 42 and the tether anchor 36 may be secured to the support member 32 by other means such as fasteners or adhesives.

Figure 3:
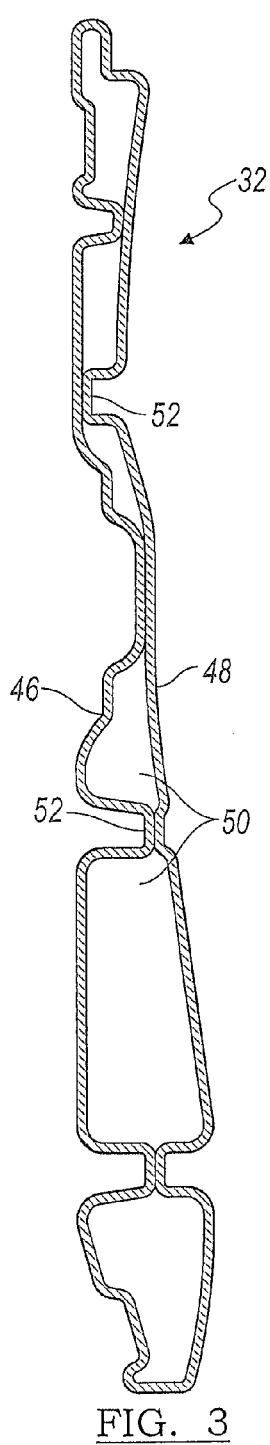
FIG. 3 is a cross-section of the structural support member shown along section A-A in FIG. 2, prior to the pocketed sections being filled.

FIG. 3 illustrates a cross-section of the structural support member 32 shown along section A-A. The support member 32 includes a first wall portion 46 and a second wall portion 48. The first wall portion 46 is spaced from the second wall portion 48 at a plurality of locations to form a plurality of pocketed sections 50. The support member 32 is preferably formed by a blow molding process. Alternatively, the support member 32 may be formed by an injection molding process.

Figure 4:
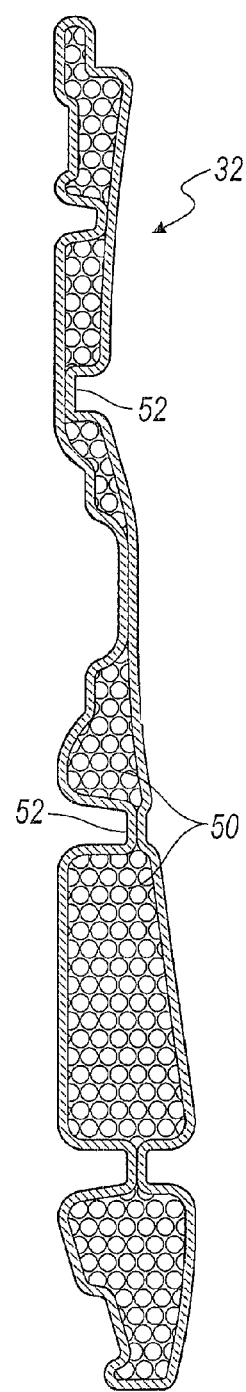
FIG. 4 is a cross-section of the structural support member shown along section A-A in FIG. 2, during the insert molding process.
Figure 5:
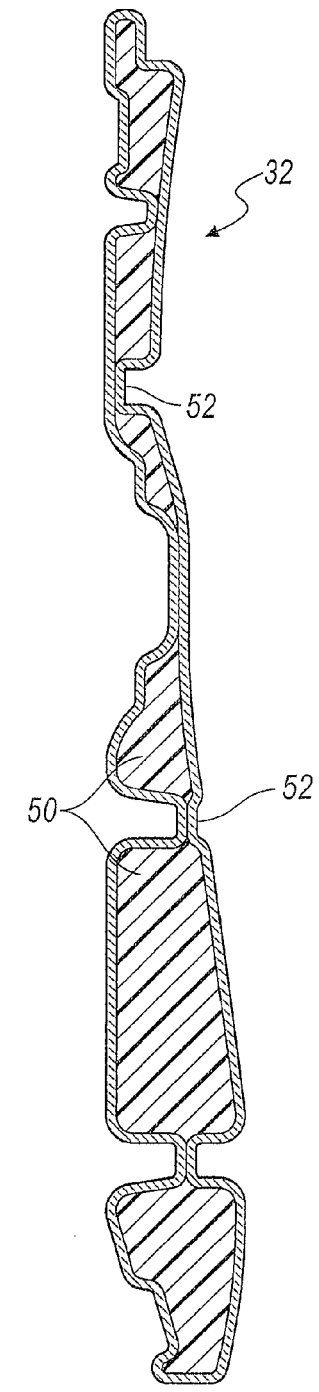
FIG. 5 is a cross-section of the structural support member shown along section A-A in FIG. 2, after the insert molding process is completed.

The plurality of pocketed sections 50, when initially formed by the molding process, are hollow. The plurality of pocketed sections 50 are substantially filled with an expandable plastic material such as an expandable polypropylene material (EPP). Preferably, the EPP material is in bead-form when injected into the hollow pocketed sections 50 as shown in FIG. 4. The pocketed sections 50 are openly connected to one another for allowing the EPP material to flow to each respective pocketed section. Steam or a water substance is then injected into the EPP-filled pocketed sections 50 to fuse the EPP beads together. The EPP expands as the beads are fused together thereby filling the voids within the pocketed sections 50 as shown in FIG. 5. Furthermore, if a polypropylene-based material is used to form the support member, the EPP material when fused has higher retention properties in adhering to the polypropylene-based material support member than a non-polypropylene material.

The EPP-filled pocketed sections 50 are energy absorbent, thus allowing absorption of energy for anything impacting the backrest portion. In addition, the EPP-filled pocketed sections 50 provide added stiffness and rigidity for structurally supporting the backrest 24 and the person seated against the backrest. A plurality of closed wall sections 52 in cooperation with the EPP-filled pocketed sections 50 enhance the stiffness and rigidity of the support member 32.

The support member 32 may be molded to accommodate the various shapes and contours of the backrest portion 24 while still maintaining adequate structural support of the backrest portion 24. For example the number of the plurality of pocketed sections 50, including the shape and size of each respective pocketed section, may vary depending on the structural support required. In addition, the plurality of closed wall sections 52 may vary in length, thickness and geometry to achieve the structural support required.

Figure 6:
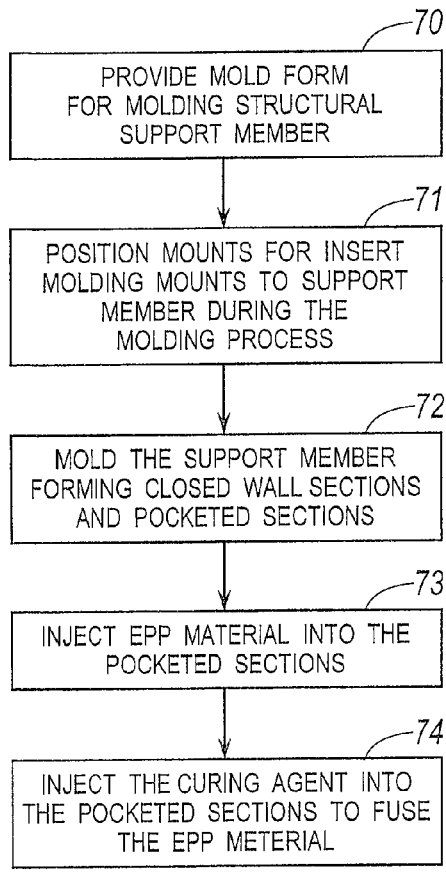
FIG. 6 is a method for forming a framework for a backrest of a vehicle seat according to a first preferred embodiment of the present invention.

FIG. 6 is a method for forming a framework for a backrest of a vehicle seat according to a first preferred embodiment of the present invention. In step 70, a mold form is provided for forming a structural support member for a backrest portion made from a plastic material. Preferably, a polypropylene-based material is used. Alternatively, other types of plastics or polymers may be used. In step 71, mounts, if any, are positioned in the mold form for insert-molding the mounts during the molding process. In step 72, the closed wall sections and hollowed pocketed sections are formed during the molding process in addition to the mounts being insert-molded.

In step 73, an expandable material such as EPP is injected into the pocketed sections. Preferably, the EPP material in the form of pellets is utilized. The EPP pellets substantially fill the hollow pocketed sections of the support member leaving small numerous voids. In step 74, the curing agent is injected into the EPP-filled pocketed sections. Preferably, steam is injected into the EPP-filled pocketed sections for curing the EPP material. Alternatively, another curing agent may be injected into the pocketed sections to cure the EPP material. The EPP pellets, when mixed with the curing agent, expand and fuse to each other. The EPP, when fused, creates a one piece solid-like structure filling the voids within each of the pocketed sections.

Figure 7:
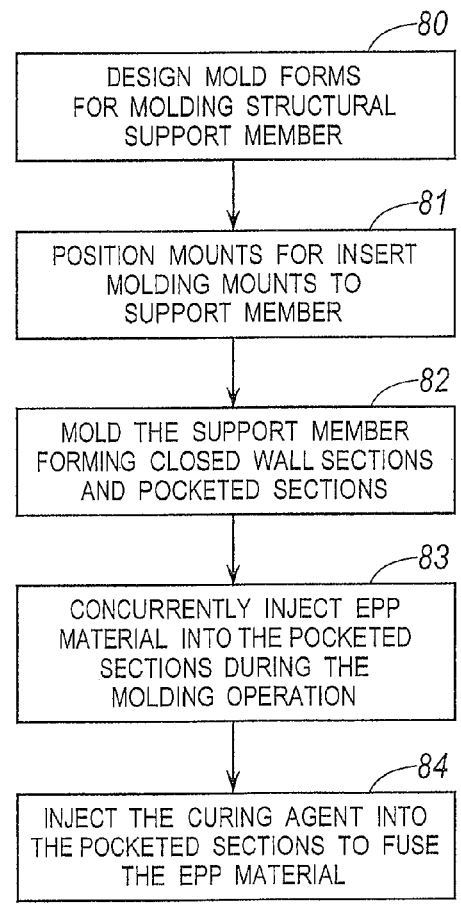
FIG. 7 is a method for forming a framework for a backrest of a vehicle seat according to a second preferred embodiment of the present invention.

FIG. 7 is a method for forming a framework for a backrest of a vehicle seat according to a second preferred embodiment of the present invention. In step 80, a mold form is provided for forming a structural support member for a backrest portion made from a plastic material. In step 81, mounts, if any, are positioned in the mold form for insert-molding the mounts during the molding process. In step 82, a plastic material is injected into the mold for forming the structural member. The mold form includes formations for forming closed wall sections and hollowed pocketed sections.

In step 83, an expandable material such as EPP is injected into the pocketed sections concurrently during the molding process of the support member. Preferably, EPP material in the form of pellets is utilized. The EPP pellets substantially fill the hollow pocketed sections as the support member is formed. The EPP pellets may initiate fusing to the wall sections of the support member during the molding process due to the hot liquid plastic being present when forming the structural member. In step 84, the curing agent is injected into the EPP-filled pocketed sections to cure the remaining unfused EPP material disposed within each of the pocketed sections.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A structural support member for a vehicle seat comprising:
a first wall and a second wall, wherein
each of the first and second walls is formed from a plastic material that has been formed to a predetermined shape,
the first and second walls have respective first regions that engage one another so as to define a plurality of ribs and have respective second regions that are spaced apart from one another so as to define a plurality of hollow pocketed sections separated by the plurality of ribs, wherein the hollow pocketed sections are openly connected to one another;
each of the hollow pocketed sections is substantially filled with an expandable plastic material that provides rigidity throughout substantially all of the hollow pocketed sections of the support member, the expandable plastic material being capable of initially flowing freely between and substantially filling each of said openly connected plurality of pocketed sections and subsequently expanding for providing rigidity throughout substantially all of the hollow pocketed sections of the support member.

* * * * *